Patented May 7, 1946

2,400,053

UNITED STATES PATENT OFFICE 2,400,053

PROCESS OF MANUFACTURING A COMPOSITION FROM WASTE LIQUOR OF CELLULOSE

Eberhard Rheinberger, Berlin, Germany; vested in the Alien Property Custodian

No Drawing. Application January 14, 1943, Serial No. 472,428. In Switzerland March 26, 1942

1 Claim. (Cl. 106—123)

The invention relates to a process of manufacturing a composition from waste liquor of cellulose.

Waste liquor of cellulose is known to be the residual liquor obtained by the various methods in the manufacture of cellulose. Heretofore such waste liquor could not be utilized for the most part. Some constituents of the liquor have been recovered indeed, such as, for instance, vanilline or alcohol. It has also been suggested to precipitate part of the liquor by adding chemicals and to use the precipitation for the manufacture of pressed articles. In all of such cases, however, a very large portion of the waste liquor remains unused. In addition, the processes of obtaining the precipitation are relatively cumbersome and expensive, and the pressed articles made from such precipitations show a good deal of defects as regards hygroscopicity, strength and capability of being pressed.

The invention provides a process adapted to convert the totality of waste liquor into a homogeneous composition.

In particular, the invention has for its object the mixing of the waste liquor with chemicals of such kind as to form, in its entirety, a homogeneous composition, preferably a gel.

Another object of the invention is the preparation from waste liquor of a composition which may be used as kind of a synthetic resin.

Another object of the invention is the composition proper obtained from waste liquor. A composition of this kind may be used with or without filler or with or without dyestuffs. For example, it may be used for varnishlike coats or as glue. If it is desired to use it as a molded plastic, it will as a rule be convenient to mix it with fillers and, if necessary, also with agents improving both the ability of flowing and ability of sliding of the composition during the pressing operation. The composition may then be pressed under pressure and heat as well as worked by die casting.

According to the invention, the waste liquor will be treated with a cyanamide compound of the alkaline-earth metals until it is converted into a homogeneous composition. A most satisfactory cyanamide compound of this kind has proved to be calcium cyanamide. The waste liquor is preferably used after being concentrated to 30° Bé. Liquor not being thickened may also be used. Hereinafter it is always referred to a liquor already concentrated to 30° Bé. When using a thinner liquor for the examples specified hereunder, a correspondingly larger amount of liquor will have to be used. It is not necessary to treat the liquor beforehand, but waste liquor treated already, particularly waste liquor from which alcohol has already been extracted, may also be used.

It has been found suitable to reckon about from 30 to 250 grams of calcium cyanamide in 150 to 300 grams of concentrated liquor and to stir up these substances at a temperature ranging from 50° to 100° C. It is also possible to carry out the mixing at a lower temperature, but in this case the process will require more time. While being stirred at a slight heat the mixture being thinly liquid at the beginning will soon be converted, in its entirety, i. e., without any residue, into a tough, gel-like composition. This composition may be dried and used in the form of a synthetic resin. If it is desired to use the composition for the manufacture of molded plastics, it will be suitable to add the filler, e. g., from 50 to 200 grams of wood meal, to the above composition and also, if desired, to add sliding wax and coloring substances and then to dry the total composition to a moisture content of from 3 to 5 per cent. and to grind the dried composition to give a uniform granulation. This pressing powder may then be pressed preferably at temperatures ranging from 160° to 180° C.

To increase the ability of flowing it is recommended, according to another object of the invention, to add easily fusible, inorganic salts or easily fusible, organic compounds; according to an object of the invention, particularly nitrates, nitro compounds or nitric acid treated substances, especially organic matters, such as, e. g., tar, mineral wax, phenol, urea, are used for this purpose, said substances being referred to hereunder as "nitro substances."

For example, in the mixture above referred to, an amount of from 2 to 30 grams of montan wax may be mixed with from 5 to 30 cu. cm. of concentrated nitric acid and added to the calcium cyanamide in heated condition prior to the calcium cyanamide being stirred up with the liquor.

To produce compositions having definite properties it will be suitable to treat the liquor with the cyanamide compound of the alkaline-earth metal at a higher temperature and higher pressures. In such cases the treatment in the autoclave at temperatures ranging from 200° to 500° C. and the resulting pressures has proved satisfactory. Also in this case it is recommended when making molded plastics to add the easily fusible inorganic salts or organic compounds or "nitro substances" to the composition to be treated in the autoclave. The composition treated in the autoclave will then be inspissated to the desired consistency and may be mixed with fillers, coloring substances and sliding waxes, ground and pressed.

I claim:

A process of manufacturing a powder to be transformed into articles molded under heat and pressure which comprises adding from 2 to 30 grams of montan wax with from 5 to 30 cu. cm. of concentrated nitric acid to a cyanamide compound of an alkaline earth metal, then adding this mixture to sulphite waste liquor, thoroughly mixing until the materials react in their entirety, forming a tough gel-like composition, adding a filler, drying and grinding to powder.

EBERHARD RHEINBERGER.